United States Patent
Tasaka (10) Patent No.: US 8,729,139 B2
(45) Date of Patent: May 20, 2014

(54) METHOD FOR RECOVERING HYDROCARBON COMPOUNDS AND A HYDROCARBON RECOVERY APPARATUS FROM A GASEOUS BY-PRODUCT

(75) Inventor: Kazuhiko Tasaka, Tokyo (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 264 days.

(21) Appl. No.: 13/138,472

(22) PCT Filed: Feb. 26, 2010

(86) PCT No.: PCT/JP2010/001325
§ 371 (c)(1),
(2), (4) Date: Aug. 22, 2011

(87) PCT Pub. No.: WO2010/098129
PCT Pub. Date: Sep. 2, 2010

(65) Prior Publication Data
US 2011/0306682 A1 Dec. 15, 2011

(30) Foreign Application Priority Data
Feb. 27, 2009 (JP) .................................. 2009-046151

(51) Int. Cl.
*C07C 27/00* (2006.01)
*C07C 7/00* (2006.01)
(52) U.S. Cl.
USPC ........................... 518/700; 518/728; 585/802

(58) Field of Classification Search
USPC ................................... 518/700, 728; 585/802
See application file for complete search history.

(56) References Cited

U.S. PATENT DOCUMENTS

| 2,514,340 A | 7/1950 | Rupp |
| 2,628,970 A | 2/1953 | Arnold et al. |

(Continued)

FOREIGN PATENT DOCUMENTS

| EP | 1 887 072 | 2/2008 |
| JP | 2004-323626 | 11/2004 |

(Continued)

OTHER PUBLICATIONS

International Search Report dated Mar. 23, 2010 issued in corresponding PCT Application No. PCT/JP2010/001325.

(Continued)

*Primary Examiner* — Jafar Parsa
(74) *Attorney, Agent, or Firm* — Kenyon & Kenyon LLP (57) ABSTRACT

There is provided a method for recovering hydrocarbon compounds from gaseous by-products generated in a Fischer-Tropsch synthesis reaction. The method includes absorbing light hydrocarbon compounds and a carbon dioxide gas from the gaseous by-products using an absorption solvent including liquid hydrocarbon compounds and a carbon dioxide gas absorbent, separating the absorption solvent which has absorbed the light hydrocarbon compounds and the carbon dioxide gas into the liquid hydrocarbon compounds and the carbon dioxide gas absorbent, heating the separated liquid hydrocarbon compounds to recover the light hydrocarbon compounds from the separated liquid hydrocarbon compounds, heating the separated carbon dioxide gas absorbent to strip the carbon dioxide gas from the separated carbon dioxide gas absorbent, and reusing the gaseous by-products from which the light hydrocarbon compounds and the carbon dioxide gas are absorbed as a feedstock gas for the Fischer-Tropsch synthesis reaction.

6 Claims, 4 Drawing Sheets

(56) References Cited

U.S. PATENT DOCUMENTS

| | | |
|---|---|---|
| 4,401,450 A | 8/1983 | Schramm |
| 6,958,364 B1 | 10/2005 | MacPherson et al. |
| 2003/0203983 A1 | 10/2003 | O'Rear et al. |
| 2003/0236312 A1 | 12/2003 | O'Rear |
| 2004/0220443 A1* | 11/2004 | De Graaf et al. ............ 585/943 |
| 2009/0186952 A1* | 7/2009 | Steynberg et al. ............ 518/704 |

FOREIGN PATENT DOCUMENTS

| | | |
|---|---|---|
| JP | 2005-530892 | 10/2005 |
| JP | 2008-506817 | 3/2008 |
| WO | WO 2007/077137 | 7/2007 |

OTHER PUBLICATIONS

Adus et al., "$CO_2$ Abatement in Gas-To-Liquid Plants," Studies in Surface Science and Catalysis, 2001, 136, p. 519-524.

European Search Report dated Oct. 23, 2012 issued in corresponding European Application No. 10 74 6012.

Audus et al., "Co2 Abatement in Gas-To-Liquid Plants," Studies in Surface Science and Catalysis, 2001, 136, p. 519-524.

* cited by examiner

METHOD FOR RECOVERING HYDROCARBON COMPOUNDS AND A HYDROCARBON RECOVERY APPARATUS FROM A GASEOUS BY-PRODUCT

TECHNICAL FIELD

The present invention relates to a method for recovering hydrocarbon compounds and a hydrocarbon recovery apparatus which recover hydrocarbon compounds from a gaseous by-product generated in the process of synthesizing liquid hydrocarbon compounds by a Fischer-Tropsch synthesis reaction.

This application is a national stage application of International Application No. PCT/JP2010/001325, filed 26 Feb. 2010, which claims priority to Japanese Patent Application No. 2009-046151, filed Feb. 27, 2009, the content of which is incorporated herein by reference.

BACKGROUND ART

As one of methods for a synthesizing liquid fuel from a natural gas, a GTL (Gas To Liquids: a liquid fuel synthesis) technique of reforming a natural gas to synthesize a synthesis gas containing a carbon monoxide gas (CO) and a hydrogen gas ($H_2$) as main components, synthesizing hydrocarbon compounds (FT synthesis hydrocarbons) using this synthesis gas as a feedstock gas by a Fischer-Tropsch synthesis reaction (hereinafter referred to as "FT synthesis reaction"), and further hydrogenating and fractionally distilling the hydrocarbon compounds to produce liquid fuel products, such as a naphtha (raw gasoline), a kerosene, a gas oil, and a wax, has recently been developed.

Since the liquid fuel products using the FT synthesis hydrocarbons as a feedstock have a high paraffin content, and hardly include sulfur components, for example, as shown in Patent Document 1, the liquid fuel products attract attention as environment-friendly fuels.

Meanwhile, in an FT synthesis reactor which performs the FT synthesis reaction, heavy FT synthesis hydrocarbons (heavy FT hydrocarbons) with a comparatively high carbon number flow out as a liquid from a lower part of the FT synthesis reactor. In addition, light FT synthesis hydrocarbons with a comparatively low carbon number are generated involuntarily. The light FT synthesis hydrocarbons are discharged as a gaseous by-products along with an unreacted feedstock gas, from an upper part of the FT synthesis reactor.

The gaseous by-products includes commercially available hydrocarbon compounds of which a number of carbon atoms is 3 or more (hereinafter referred to as "light hydrocarbon compounds"), along with carbon dioxide, a steam, unreacted feedstock gas (carbon monoxide gas and hydrogen gas), and hydrocarbon compounds of which a number of carbon atoms is 2 or less. Thus, if the content of the light hydrocarbon compounds increases in the gaseous by-product, the production efficiency of the liquid fuel products will decrease.

Conventionally, the gaseous by-products are cooled down to liquefy the light hydrocarbon compounds, and then the light hydrocarbon compounds are separated from the other gas components by a gas-liquid separator.

Moreover, a method for recovering light hydrocarbon compounds contained in a FT hydrocarbon-enriched emission gas by absorbing in an FT condensate while cooling is disclosed in the following Patent Document 2.

CITATION LIST

Patent Document

[Patent Document 1] Japanese Patent Unexamined Publication No. 2004-323626
[Patent Document 2] Published Japanese Translation No. 2008-506817 of the PCT International Publication

SUMMARY OF INVENTION

Technical Problem

Meanwhile, in the method disclosed in Patent Document 2, the carbon dioxide gas cannot be removed from the gaseous by-products. For this reason, when the gaseous by-products are reused as a feedstock for the FT synthesis reaction, the carbon dioxide gas may be concentrated in the FT synthesis reactor, and thereby the efficiency of the FT synthesis reaction may decrease.

On the other hand, by cooling down the gaseous by-products in the aforementioned gas-liquid separator to about 10° C., it is possible to liquefy considerable amount of the light hydrocarbon compounds and to separate the light hydrocarbon compounds from the other gas components. However, it is necessary to provide a extra cooler, and thereby the production facility becomes complicated. As a result, the production cost of liquid fuel products increases.

The present invention has been made in view of the aforementioned circumstances, and the object thereof is to provide a method for recovering hydrocarbon compounds and a hydrocarbon recovery apparatus, capable of efficiently recovering light hydrocarbon compounds from the gaseous by-products and improving the production efficiency of liquid fuel products.

Solution to Problem

In order to solve the above problem and achieve such an object, the present invention suggests the following methods and apparatuses.

That is, a method for recovering hydrocarbon compounds from gaseous by-products generated in a Fischer-Tropsch synthesis reaction.

The method includes absorbing light hydrocarbon compounds and a carbon dioxide gas from the gaseous by-products using an absorption solvent including liquid hydrocarbon compounds and a carbon dioxide gas absorbent, separating the absorption solvent which has absorbed the light hydrocarbon compounds and the carbon dioxide gas into the liquid hydrocarbon compounds and the carbon dioxide gas absorbent, heating the separated liquid hydrocarbon compounds to recover the light hydrocarbon compounds from the separated liquid hydrocarbon compounds, heating the separated carbon dioxide gas absorbent to strip the carbon dioxide gas from the separated carbon dioxide gas absorbent, and reusing the gaseous by-products from which the light hydrocarbon compounds and the carbon dioxide gas are absorbed as a feedstock gas for the Fischer-Tropsch synthesis reaction.

In the method for recovering the hydrocarbon compounds of the present invention, the light hydrocarbon compounds and carbon dioxide gas included in the gaseous by-products can be absorbed with the absorption solvent including the liquid hydrocarbon compounds and the carbon dioxide gas absorbent. Then, after the absorption solvent is separated into the liquid hydrocarbon compounds and the carbon dioxide gas absorbent, the separated the separated liquid hydrocarbon compounds and carbon dioxide gas absorbent are heated at the predetermined temperatures, respectively, so that the carbon dioxide gas can be stripped from the carbon dioxide gas absorbent, and the light hydrocarbon compounds can be recovered from the liquid hydrocarbon compounds. In addition, in the method for recovering hydrocarbon compounds according to the present invention, the facility of the $CO_2$ removal unit in the synthesis gas production unit in the GTL plant facility may be used as it is. In this case, it is not necessary to install a new facility. Hence, the light hydrocarbon compounds can be efficiently recovered from the gaseous by-products without using an extra cooler and the like.

Additionally, since the carbon dioxide gas is removed from the gaseous by-products, it is possible to reuse the gaseous by-products as a feedstock gas for the FT synthesis reaction, while preventing concentration of the carbon dioxide gas in the FT synthesis reactor.

Here, the absorption solvent may contain amines as a component of the carbon dioxide gas absorbent.

In this case, the carbon dioxide gas included in the gaseous by-products can be efficiently absorbed in the absorption solvent. Moreover, the carbon dioxide gas can be stripped by heating the carbon dioxide absorbent separated from the absorption solvent which has absorbed the carbon dioxide and light hydrocarbon compounds. In addition, the boiling point of the carbon dioxide gas absorbent may be 200° C. or higher.

Additionally, the boiling point of the liquid hydrocarbon compounds contained in the absorption solvent may be within a temperature range of 200° C. or higher and 360° C. or lower.

In this case, when the liquid hydrocarbon compounds separated from the absorption solvent which has absorbed the carbon dioxide and light hydrocarbon compounds are heated at the temperature lower than 200° C., volatilization of the liquid hydrocarbon compounds themselves can be suppressed. Thus, the liquid hydrocarbon compounds can be repeatedly used. Additionally, compared with a case using hydrocarbon compounds with a boiling point higher than 360° C., the absorption solvent including the above liquid hydrocarbon compounds is more difficult to freeze even at a relatively low temperature. Then the absorption solvent can keep the fluidity.

Moreover, the separated carbon dioxide gas absorbent may be heated at a temperature of 100° C. or higher and 150° C. or lower, and the separated liquid hydrocarbon compounds may be heated at a temperature of 100° C. or higher and 200° C. or lower.

In this case, since the separated carbon dioxide gas absorbent is heated at a temperature of 100° C. or higher, the carbon dioxide gas can be efficiently stripped. On the other hand, since the separated carbon dioxide gas absorbent is not heated at a higher temperature than 150° C., volatilization of the carbon dioxide gas absorbent can be suppressed.

Additionally, since the separated liquid hydrocarbon compounds are heated at a temperature of 100° C. or higher, the light hydrocarbon compounds can be efficiently recovered. On the other hand, since the separated liquid hydrocarbon compounds are not heated at a higher temperature than 200° C., volatilization of the liquid hydrocarbon compounds can be suppressed.

Moreover, the absorption of the light hydrocarbon compounds and the carbon dioxide gas in the gaseous by-products by the absorption solvent may be performed, after the gaseous by-products and a feedstock gas for the FT synthesis reaction are mixed together.

The feedstock gas (a mixed gas of a carbon monoxide and a hydrogen) for the Fischer-Tropsch synthesis reaction includes the carbon dioxide gas. Therefore, the carbon dioxide gas included in the feedstock gas and that included in the gaseous by-products can be simultaneously and efficiently absorbed by absorbing the carbon dioxide gas after mixing of the feedstock gas and the gaseous by-products.

Additionally, the absorption solvent used in the absorbing the carbon dioxide gas and the light hydrocarbon compounds may contain the carbon dioxide gas absorbent from which the carbon dioxide gas has been stripped by heating, and the liquid hydrocarbon compounds from which the light hydrocarbon compounds has recovered by heating.

The carbon dioxide gas absorbent from which the carbon dioxide gas has been stripped and the liquid hydrocarbon compounds from which the light hydrocarbon compounds are recovered can absorb the carbon dioxide gas and the light hydrocarbon compounds again, respectively. Thus, the cost for the recovery of the light hydrocarbon compounds can be depressed by reusing the absorption solvent which has been regenerated as above.

The hydrocarbon recovery apparatus of the present invention is for recovering hydrocarbon compounds from a gaseous by-products discharged from an Fisher-Tropsch synthesis reactor. The hydrocarbon recovery apparatus includes an absorber which allows an absorption solvent including a carbon dioxide gas absorbent and liquid hydrocarbon compounds to absorb a carbon dioxide gas and light hydrocarbon compounds from the gaseous by-products, a separator which separates the absorption solvent including the carbon dioxide gas and the light hydrocarbon compounds into the carbon dioxide gas absorbent and the liquid hydrocarbon compounds, a carbon dioxide gas stripping device which strips the carbon dioxide gas from the separated carbon dioxide gas absorbent, a light hydrocarbon recovering device which recovers the light hydrocarbon compounds from the separated liquid hydrocarbon compounds, and a gaseous by-product supply line which allows the gaseous by-products from which the light hydrocarbon compounds and the carbon dioxide gas are absorbed, to be supplied to the Fisher-Tropsch synthesis reactor.

According to the hydrocarbon recovery apparatus having this configuration, the carbon dioxide gas and the light hydrocarbon compounds included in the gaseous by-products are absorbed in the absorption solvent. The absorption solvent which has absorbed the carbon dioxide gas and the light hydrocarbon compounds is separated into the carbon dioxide gas absorbent and the liquid hydrocarbon compounds. The carbon dioxide gas absorbent separated in the separator is stored and heated in the carbon dioxide gas stripping device to releases the carbon dioxide gas. In addition, the light hydrocarbon compounds are recovered from the liquid hydrocarbon compounds in the light hydrocarbon recovering device. Thus, according to the present invention, the carbon dioxide gas can be efficiently removed from the gaseous by-products, and the light hydrocarbon compounds can be recovered from the gaseous by-product.

Moreover, the gaseous by-products, from which the included light hydrocarbon compounds and the carbon dioxide gas have been removed in the absorber, can be supplied to the FT synthesis reactor via the gaseous by-product supply line. As a result, it is possible to reuse the gaseous by-products, from which the included light hydrocarbon compounds and the carbon dioxide gas have been removed, as a feedstock for the FT synthesis reaction.

Here, the hydrocarbon recovery apparatus may further includes a recycle line which allows the carbon dioxide gas absorbent from which the carbon dioxide gas is stripped, and the liquid hydrocarbon compounds from which the light hydrocarbon compounds are recovered, to be recycle to the absorber.

In this case, since the carbon dioxide gas absorbent from which the carbon dioxide gas has been stripped and the liquid hydrocarbon compounds from which the light hydrocarbon compounds have been recovered, can be recycled to the absorber, it is possible to obtain the absorption solvent including the regenerated carbon dioxide absorbent and liquid hydrocarbon compounds, and to reuse the absorption solvent in the absorber.

Moreover, the absorber may be a carbon dioxide gas absorption tower which absorbs a carbon dioxide gas included in a feedstock gas introduced into the Fisher-Tropsch synthesis reactor.

The carbon dioxide gas is contained in the feedstock gas (a mixed gas of a carbon monoxide and a hydrogen) used for the FT synthesis reaction as mentioned above. Therefore, the carbon dioxide gas absorption tower may be provided at upstream of the FT synthesis reactor in order to remove the carbon dioxide gas contained in the feedstock gas. Thus, by using the absorption solvent including the carbon dioxide gas absorbent and the liquid hydrocarbon compounds in the carbon dioxide gas absorption tower, the carbon dioxide gas can be removed and the light hydrocarbon compounds can be recovered from the gaseous by-products, without separately providing a new facility.

Advantageous Effects of Invention

According to the present invention, it is possible to provide a method for recovering hydrocarbon compounds and a hydrocarbon recovery apparatus, capable of efficiently recovering the light hydrocarbon compounds from the gaseous by-products, and improving the production efficiency of liquid fuel products.

DESCRIPTION OF EMBODIMENTS

Hereinafter, a preferred embodiment of the present invention will be described with reference to the accompanying drawings.

First, the overall configuration of a liquid-fuel synthesizing system (hydrocarbon synthesis reaction system) for which a hydrocarbon recovery apparatus of the present embodiment is used will be described with reference to FIG. 1.

Figure 1:
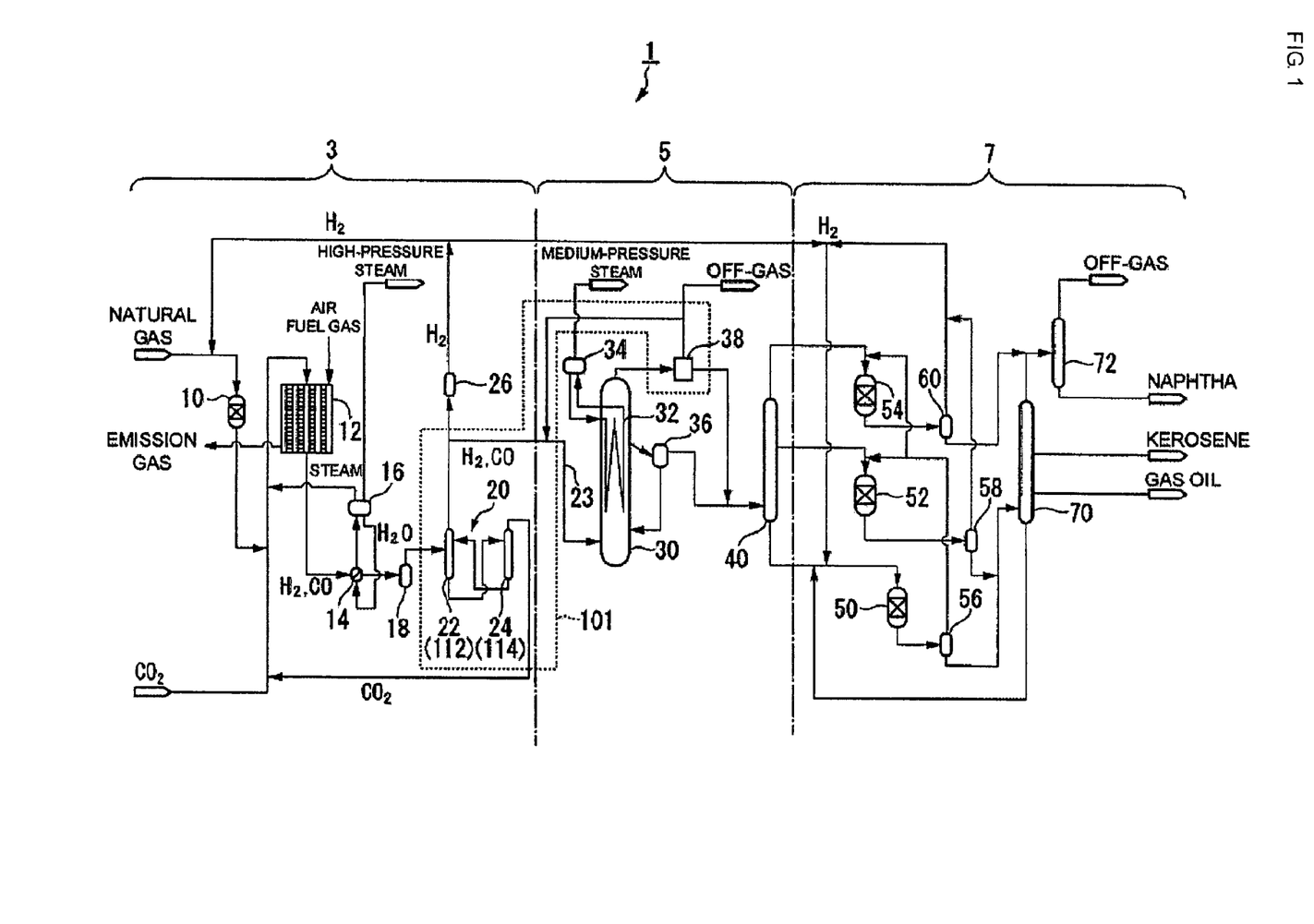
FIG. 1 is a schematic diagram showing the overall configuration of a hydrocarbon compounds synthesizing system for which a hydrocarbon recovery apparatus according to an embodiment of the present invention is used.

As shown in FIG. 1, the liquid fuel synthesizing system (hydrocarbon synthesis reaction system) 1 according to the present embodiment is a plant facility which carries out the GTL process which converts a hydrocarbon feedstock, such as a natural gas, into liquid fuels. This liquid-fuel synthesizing system 1 includes a synthesis gas production unit 3, an FT synthesis unit 5, and an upgrading unit 7.

The synthesis gas production unit 3 reforms a natural gas, which is a hydrocarbon feedstock, to produce a synthesis gas (feedstock gas) including a carbon monoxide gas and a hydrogen gas.

The FT synthesizing unit 5 synthesizes liquid hydrocarbon compounds from the produced synthesis gas by a Fischer-Tropsch synthesis reaction (hereinafter referred to as "FT synthesis reaction").

The upgrading unit 7 hydrogenates and fractionally distills the liquid hydrocarbon compounds synthesized by the FT synthesis reaction to produce liquid fuel products (a naphtha, a kerosene, a gas oil, a wax, etc.). Hereinafter, components of these respective units will be described.

The synthesis gas production unit 3 mainly includes a desulfurization reactor 10, a reformer 12, a waste heat boiler 14, gas-liquid separators 16 and 18, a $CO_2$ removal unit 20, and a hydrogen separator 26.

The desulfurization reactor 10 is composed of, for example, a hydrodesulfurizer, and removes sulfur components from a natural gas that is a feedstock.

The reformer 12 reforms the natural gas supplied from the desulfurization reactor 10, to produce a synthesis gas including a carbon monoxide gas (CO) and a hydrogen gas ($H_2$) as main components.

The waste heat boiler 14 recovers waste heat of the synthesis gas produced in the reformer 12, to generate high-pressure steam.

The gas-liquid separator 16 separates the water heated by the heat exchange with the synthesis gas in the waste heat boiler 14 into a gas (high-pressure steam) and a liquid.

The gas-liquid separator 18 removes condensed components from the synthesis gas cooled down in the waste heat boiler 14, and supplies a gas component to the $CO_2$ removal unit 20.

The $CO_2$ removal unit 20 has an absorption tower 22 which removes a carbon dioxide gas by using an absorption solvent from the synthesis gas supplied from the gas-liquid separator 18, and a regeneration tower 24 which strips the carbon dioxide gas from the absorption solvent including the carbon dioxide gas and regenerates the absorption solvent.

The hydrogen separator 26 separates a portion of the hydrogen gas included in the synthesis gas, from which the carbon dioxide gas has been separated in the $CO_2$ removal unit 20.

The FT synthesis unit 5 mainly includes, for example, a bubble column reactor (a bubble column type hydrocarbon synthesis reactor) 30, a gas-liquid separator 34, a separator 36, a hydrocarbon recovery apparatus 101 that is the present embodiment, and a first fractionator 40.

The bubble column reactor 30, which is an example of a reactor which synthesizes liquid hydrocarbon compounds from a synthesis gas, functions as an FT synthesis reactor which synthesizes liquid hydrocarbon compounds from the synthesis gas by the FT synthesis reaction. The bubble column reactor 30 includes, for example, a bubble column slurry bed type reactor in which a slurry having solid catalyst particles suspended in liquid hydrocarbon compounds (product of the FT synthesis reaction) is contained inside a column type vessel. The bubble column reactor 30 makes the carbon monoxide gas and hydrogen gas in the synthesis gas produced in the above synthesis gas production unit 3 react with each other to synthesize liquid hydrocarbon compounds.

The gas-liquid separator 34 separates the water circulated and heated through a heat transfer pipe 32 disposed in the bubble column reactor 30 into a steam (medium-pressure steam) and a liquid.

The separator 36 separates the catalyst particles and liquid hydrocarbon compounds in the slurry contained inside the bubble column reactor 30.

The hydrocarbon recovery apparatus 101 is connected to the top of the bubble column reactor 30, and recovers hydrocarbon compounds of which a number of carbon atoms is 3 or more (hereinafter referred to as "light hydrocarbon compounds") from discharged gaseous by-products.

The first fractionator 40 fractionally distills the liquid hydrocarbon compounds supplied from the bubble column reactor 30 via the separator 36 and the gas-liquid separator 38 into the respective fractions.

The upgrading unit 7 includes, for example, a wax fraction hydrocracking reactor 50, a middle distillate hydrotreating reactor 52, a naphtha fraction hydrotreating reactor 54, gas-liquid separators 56, 58, and 60, a second fractionator 70, and a naphtha stabilizer 72.

The wax fraction hydrocracking reactor 50 is connected to the bottom of the first fractionator 40, and has the gas-liquid separator 56 provided on the downstream thereof.

The middle distillate hydrotreating reactor 52 is connected to a middle part of the first fractionator 40, and has the gas-liquid separator 58 provided at the downstream thereof.

The naphtha fraction hydrotreating reactor 54 is connected to the top of the first fractionator 40, and has the gas-liquid separator 60 provided at the downstream thereof.

The second fractionator 70 fractionally distills the liquid hydrocarbon compounds supplied from the gas-liquid separators 56 and 58 depending on boiling points.

The naphtha stabilizer 72 further rectifies the liquid hydrocarbon compounds equivalent to a naphtha fraction supplied from the gas-liquid separator 60 and the second fractionator 70, to discharge a light component as an off-gas and separate and recover a heavy component as a naphtha product.

Next, a process (GTL process) of synthesizing liquid fuels from a natural gas by the liquid-fuel synthesizing system 1 configured as above will be described.

A natural gas (the main component of which is $CH_4$) as a hydrocarbon feedstock is supplied to the liquid-fuel synthesizing system 1 from an external natural gas supply source (not shown), such as a natural gas field or a natural gas plant. The above synthesis gas production unit 3 reforms this natural gas to produce synthesis gas (mixed gas including a carbon monoxide gas and a hydrogen gas as main components).

First, the above natural gas is supplied to the desulfurization reactor 10 along with the hydrogen gas separated by the hydrogen separator 26. The desulfurization reactor 10 converts sulfur components included in the natural gas using the hydrogen gas into hydrogen sulfide by the action of a hydrodesulfurization catalyst, and adsorbs and removes the produced hydrogen sulfide by, for example, ZnO, and so on.

The desulfurized natural gas is supplied to the reformer 12 after the carbon dioxide gas ($CO_2$) supplied from a carbon-dioxide supply source (not shown) and the steam generated in the waste heat boiler 14 are mixed together. The reformer 12 reforms a natural gas by using a carbon dioxide and a steam to produce a high-temperature synthesis gas including a carbon monoxide gas and a hydrogen gas as main components, by the steam and carbon-dioxide-gas reforming method.

The high-temperature synthesis gas (for example, 900° C., 2.0 MPaG) produced in the reformer 12 in this way is supplied to the waste heat boiler 14, and is cooled down (for example, to 400° C.) by the heat exchange with the water which circulates through the waste heat boiler 14, thereby recovering the exhausted heat.

The synthesis gas cooled down in the waste heat boiler 14 is supplied to the absorption tower 22 of the $CO_2$ removal unit 20, or the bubble column reactor 30, after condensed components are separated and removed in the gas-liquid separator 18. The carbon dioxide gas is absorbed in the absorption tower 22, and the carbon dioxide gas is stripped in the regeneration tower 24. In addition, the stripped carbon dioxide gas is brought to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2:CO=2:1$ (molar ratio)) suitable for the FT synthesis reaction.

Additionally, the hydrogen separator 26 separates the hydrogen gas included in the synthesis gas, by the adsorption and desorption using a pressure difference (hydrogen PSA). This separated hydrogen gas is continuously supplied from, for example, a gas holder (not shown), via a compressor (not shown) to various hydrogen-utilizing reaction devices (for example, the desulfurization reactor 10, the wax fraction hydrocracking reactor 50, the middle distillate hydrotreating reactor 52, the naphtha fraction hydrotreating reactor 54, and so on) which perform predetermined reactions utilizing a hydrogen gas within the liquid-fuel synthesizing system 1.

Next, the above FT synthesis unit 5 synthesizes liquid hydrocarbon compounds using an FT synthesis reaction from the synthesis gas produced in the above synthesis gas production unit 3.

The synthesis gas produced in the above synthesis gas production unit 3 flows into the bottom of the bubble column reactor 30, and rises through the slurry contained in the bubble column reactor 30. At this time, within the bubble column reactor 30, the carbon monoxide gas and hydrogen gas which are included in the synthesis gas react with each other in the aforementioned FT synthesis reaction, thereby generating hydrocarbon compounds.

The liquid hydrocarbon compounds synthesized in the bubble column reactor 30 are introduced into the separator 36 along with catalyst particles as a slurry.

The separator 36 separates the slurry into a solid component, such as catalyst particles, and a liquid component including liquid hydrocarbon compounds. A portion of the separated solid component, such as the catalyst particles, is returned to the bubble column reactor 30, and a liquid component is supplied to the first fractionator 40.

Additionally, the gaseous by-products including the unreacted synthesis gas and the generated gaseous hydrocarbon compounds are discharged from the top of the bubble column reactor 30, and are supplied to the hydrocarbon recovery apparatus 101 of the present embodiment. In the hydrocarbon recovery apparatus 101, the carbon dioxide gas is removed and the light hydrocarbon compounds are recovered from the gaseous by-products. Additionally, the remaining gas component after removal of the carbon dioxide gas and the light hydrocarbon compounds includes an unreacted synthesis gas (CO and $H_2$) and hydrocarbon compounds of which a number of carbon atoms is 2 or less as main components, and a portion of the gas component is introduced into the bottom of the bubble column reactor 30 again, and is reused for the FT synthesis reaction. Additionally, the gas component which has not been reused for the FT synthesis reaction is discharged as an off-gas and is used as a fuel gas, is recovered as a fuel equivalent to LPG (Liquefied Petroleum Gas), or is reused as the feedstock of the reformer 12 of the synthesis gas production unit.

Next, the first fractionator 40 fractionally distills the liquid hydrocarbon compounds, which are supplied from the bubble column reactor 30 via the separator 36 and the hydrocarbon recovery apparatus 101 as described above, into a naphtha fraction (whose boiling point is lower than about 150° C.), a middle distillate equivalent to a kerosene and a gas oil (whose boiling point is about 150 to 350° C.), and a wax fraction (whose boiling point exceeds about 350° C.).

The liquid hydrocarbon compounds as the wax fraction (mainly $C_{21}$ or more) drawn from the bottom of the first fractionator 40 are brought to the wax fraction hydrocracking reactor 50, the liquid hydrocarbon compounds as the middle distillate (mainly $C_{11}$ to $C_{20}$) drawn from the middle part of the first fractionator 40 are brought to the middle distillate hydrotreating reactor 52, and the liquid hydrocarbon compounds as the naphtha fraction (mainly $C_5$ to $C_{10}$) drawn from the top of the first fractionator 40 are brought to the naphtha fraction hydrotreating reactor 54.

The wax fraction hydrocracking reactor 50 hydrocracks the liquid hydrocarbon compounds as the wax fraction (approximately $C_{21}$ or more), which has been drawn from the bottom of the first fractionator 40, by using the hydrogen gas supplied from the above hydrogen separator 26, to reduce the carbon number to $C_{20}$ or less. In this hydrocracking reaction, hydrocarbon compounds with a small carbon number are produced by cleaving C—C bonds of hydrocarbon compounds with a large carbon number, using a catalyst and heat. A product including the liquid hydrocarbon compounds hydrocracked in this wax fraction hydrocracking reactor 50 is separated into a gas and a liquid in the gas-liquid separator 56, the liquid hydrocarbon compounds of which are brought to the second fractionator 70, and the gas component of which (including a hydrogen gas) is brought to the middle distillate hydrotreating reactor 52 and the naphtha fraction hydrotreating reactor 54.

The middle distillate hydrotreating reactor 52 hydrotreats liquid hydrocarbon compounds as the middle distillate with a middle carbon number (approximately $C_{11}$ to $C_{20}$), which have been drawn from the middle part of the first fractionator 40, by using the hydrogen gas supplied from the hydrogen separator 26 via the wax fraction hydrocracking reactor 50. In this hydrotreating, hydrogenation of olefins which are generated as by-products in the FT synthesis reaction, conversion of oxygen-containing compounds, such as alcohols which are also by-products in the FT synthesis reaction, into paraffins by hydrodeoxygenation, and hydroisomerization of normal paraffins into isoparaffins proceed.

A product including the hydrotreated liquid hydrocarbon compounds is separated into a gas and a liquid in the gas-liquid separator 58, the liquid hydrocarbon compounds of which are brought to the second fractionator 70, and the gas component of which (including a hydrogen gas) is reused for the above hydrogenation reactions.

The naphtha fraction hydrotreating reactor 54 hydrotreats liquid hydrocarbon compounds as the naphtha fraction with a low carbon number (approximately $C_{10}$ or less), which have been drawn from the top of the first fractionator 40, by using the hydrogen gas supplied from the hydrogen separator 26 via the wax fraction hydrocracking reactor 50. A product including the hydrotreated liquid hydrocarbon compounds is separated into a gas and a liquid in the gas-liquid separator 60, the liquid hydrocarbon compounds of which are brought to the naphtha stabilizer 72, and the gas component of which (including a hydrogen gas) is reused for the above hydrogenation reaction.

Next, the second fractionator 70 fractionally distills the liquid hydrocarbon compounds, which are supplied from the wax fraction hydrocracking reactor 50 and the middle distillate hydrotreating reactor 52 as described above, into hydrocarbon compounds with a carbon number of $C_{10}$ or less (whose boiling point is lower than about 150° C.), a kerosene (whose boiling point is about 150 to 250° C.), a gas oil (whose boiling point is about 250 to 350° C.), and an uncracked wax fraction (whose boiling point is higher than 350° C.) from the wax fraction hydrocracking reactor 56. The uncracked wax fraction is obtained from the bottom of the second fractionator 70, and this is recycled to the upstream of the wax fraction hydrocracking reactor 50. A kerosene and a gas oil are drawn from the middle part of the second fractionator 70. Meanwhile, hydrocarbon compounds of $C_{10}$ or less is drawn from the top of the second fractionator 70, and is supplied to the naphtha stabilizer 72.

Moreover, the naphtha stabilizer 72 distills the hydrocarbon compounds of $C_{10}$ or less, which have been supplied from the above naphtha fraction hydrotreating reactor 54 and second fractionator 70, and thereby, obtains naphtha ($C_5$ to $C_{10}$) as a product. Accordingly, a high-purity naphtha is drawn from the bottom of the naphtha stabilizer 72. Meanwhile, an off-gas other than target products, including hydrocarbon compounds with a carbon number that is equal to or less than a predetermined number as a main component, is discharged from the top of the naphtha stabilizer 72. This off-gas is used as a fuel gas, or is recovered as a fuel equivalent to LPG.

The process (GTL process) of the liquid-fuel synthesizing system 1 has been described hitherto. By the GTL process concerned, a natural gas is converted into liquid fuels, such as a high-purity naphtha ($C_5$ to $C_{10}$), a kerosene ($C_{11}$ to $C_{15}$), and a gas oil ($C_{16}$ to $C_{20}$).

Next, the configuration of the periphery of the hydrocarbon recovery apparatus 101 of the present embodiment will be described in detail with reference to FIG. 2.

This hydrocarbon recovery apparatus 101 includes a first gas-liquid separator 103 and a second gas-liquid separator 105 which separate a liquid component (water and liquid hydrocarbon compounds) in gaseous by-products which are discharged from the top of the bubble column reactor (FT synthesis reactor) 30, a transfer means 106 such as a compressor which transfers the gaseous by-products to a synthesis gas introduction line 28, an absorber 112 into which the gaseous by-products mixed with the synthesis gas are introduced, a separator 115 which separates an absorption solvent, which has absorbed the carbon dioxide gas and the light hydrocarbon compounds in the absorber 112, into liquid hydrocarbon compounds and a carbon dioxide gas absorbent, a carbon dioxide gas stripping unit 114 which heats the carbon dioxide gas absorbent separated in the separator 115 to strip the carbon dioxide, a light hydrocarbon compound recovering unit 116 which heats the liquid hydrocarbon compounds separated in the separator 115 to recover the light hydrocarbon compounds, and an gaseous by-product supply line 113 which supplies the gaseous by-products to the bubble column reactor 30 from the absorber 112. In addition, in the present embodiment, the first gas-liquid separator 103 and the second gas-liquid separator 105 constitute the gas-liquid separator 38 in FIG. 1.

In the present embodiment, the absorption tower 22 of the aforementioned $CO_2$ removal unit 20 is used as the absorber 112, and the regeneration tower 24 of the aforementioned $CO_2$ removal unit 20 is used as the carbon dioxide gas stripping unit 114. Additionally, the synthesis gas supply line 23 through which a synthesis gas is supplied to the bubble column reactor 30 from the absorption tower 22 is used as the gaseous by-products supply line 113.

The absorber 112 (absorption tower 22) is constructed so that an absorption solvent consisting of a mixed liquid of a carbon dioxide gas absorbent and liquid hydrocarbon compounds is supplied from the upper part of the absorber 112.

The absorption solvent within the absorber 112 is brought to the separator 115 via a line, and is separated into a carbon dioxide gas absorbent and liquid hydrocarbon compounds in this separator 115. The separated carbon dioxide gas absorbent is brought to the carbon dioxide gas stripping unit 114 (regeneration tower 24), and the separated liquid hydrocarbon compounds are brought to the light hydrocarbon compound recovering unit 116.

Next, the method for recovering hydrocarbon compounds of the present embodiment using the hydrocarbon recovery apparatus 101 will be described with reference to FIGS. 2 and 3.

First, the gaseous by-products are discharged from the top of the bubble column reactor 30 (gaseous by-product discharge step S1).

The gaseous by-products are introduced into the first gas-liquid separator 103 and the second gas-liquid separator 105 where a liquid component (water and liquid hydrocarbon compounds) in the gaseous by-products is separated (gas-liquid separating step S2). In addition, a cooler 104 is provided between the first gas-liquid separator 103 and the second gas-liquid separator 105, and is constructed so that the hydrocarbon compounds in the gaseous by-products from which the liquid component has been separated in the first gas-liquid separator 103 are liquefied and further separated in the second gas-liquid separator 105. Additionally, the water and liquid hydrocarbon compounds which have been separated in the first gas-liquid separator 103 and the second gas-liquid separator 105 are recovered via recovery lines 108 and 109, respectively.

Meanwhile, the heavy FT hydrocarbons flowing out as a liquid from the bubble column reactor 30 are introduced into the aforementioned separator 36.

The gaseous by-products from which a liquid component has been separated in the first gas-liquid separator 103 and the second gas-liquid separator 105 are brought to the synthesis gas introduction line 28 by the transfer means 106, and are mixed with the synthesis gas produced in the reformer 12 (mixing step S3).

Next, the gaseous by-products mixed with the synthesis gas are introduced into the absorber 112 (introducing step S4). Then, the absorption solvent consisting of the mixed liquid of a carbon dioxide gas absorbent and liquid hydrocarbon compounds is supplied to the absorber 112 (absorption solvent supplying step S5). Thus, the carbon dioxide gas in the gaseous by-products and the synthesis gas, and the light hydrocarbon compounds in the gaseous by-products are absorbed in the absorption solvent (absorbing step S6).

Here, as the carbon dioxide gas absorbent included in the absorption solvent, aqueous solutions of amines and a like, which absorb a carbon dioxide gas and release the absorbed carbon dioxide gas by being heated at a predetermined temperature, are used. The amines include amine compounds expressed by the following general formulas (1) to (3).

$$R_1R_2N(CH_2)_nOH \quad (1)$$

$$R_1N((CH_2)_nOH)_2 \quad (2)$$

$$N((CH_2)_nOH)_3 \quad (3)$$

Here, in the formulas, $R_1$ represents hydrogen atom or an alkyl group of $C_1$ to $C_{10}$, and $R_2$ represents hydrogen atom or an alkyl group of $C_1$ to $C_4$. Additionally, n represents integers of 1 to 5. Moreover, a plurality of hydroxyalkyl groups in Formula (2) and Formula (3) shall include a case where the carbon numbers of alkylene groups which constitute these hydroxyalkyl groups are different from each other.

Concrete examples of the amine compounds which constitutes a carbon dioxide gas absorbent include alkanolamines, such as monoethanolamine, diethanolamine, triethanolamine, 2-(methylamino)ethanol, 2-(ethylamino)ethanol, 2-(propylamino)ethanol, n-butylaminoethanol, 2-(isopropylamino)ethanol, 3-(ethylamino)propanol, and dipropanolamine.

Additionally, the concentration of the amines in the aqueous solutions is set to 20 wt. % or more and 80 wt. % or less, and is more preferably set to 30 wt. % or more and 50 wt. % or less.

Meanwhile, as the liquid hydrocarbon compounds included in the absorption solvent, the liquid hydrocarbon compounds of which the boiling point is within the temperature range of 200° C. or higher and 360° C. or lower are used. Additionally, liquid hydrocarbon compounds which do not include unsaturated components are preferable. In addition, the aforementioned liquid hydrocarbon compounds may be the one with a single component, and may be a mixture of a plurality of components, or may be the liquid hydrocarbon compounds obtained when liquid hydrocarbon compounds of a middle distillate with a medium carbon number which are drawn from the middle of the first fractionator 40 are hydrotreated in the middle distillate hydrotreating reactor 52.

Next, the absorption solvent which has absorbed the carbon dioxide gas and the light hydrocarbon compounds is brought to the separator 115, and is separated into the carbon dioxide gas absorbent (aqueous solution of an amine) and liquid hydrocarbon compounds in the separator 115 (separating step S7).

Then, the carbon dioxide gas absorbent separated in the separator 115 is brought to the carbon dioxide gas stripping unit 114, and is heated at the temperature of, for example, about 100 to 150° C. within the carbon dioxide gas stripping unit 114 where carbon dioxide gas is stripped from the carbon dioxide gas absorbent (carbon dioxide stripping step S8).

Additionally, the liquid hydrocarbon compounds separated in the separator 115 are brought to the light hydrocarbon compound recovering unit 116, and are heated at the temperature of, for example, about 100 to 200° C. within the light hydrocarbon compound recovering unit 116 where light hydrocarbon compounds are recovered from the liquid hydrocarbon compounds (light hydrocarbon compound recovering step S9).

Then, the carbon dioxide gas absorbent from which the carbon dioxide gas has been stripped and the liquid hydrocarbon compounds from which the light hydrocarbon compounds have been recovered are mixed together, and are recycled to the absorber 112 via a recycle line 119 again as the absorption solvent (recycling step S10).

Additionally, the gaseous by-products from which the light hydrocarbon compounds and carbon dioxide gas have been removed pass through the absorbing step S6 along with the synthesis gas produced in the reformer 12, and then are supplied to the bubble column reactor 30 via the gaseous by-product supply line 113 (synthesis gas supply line 23) (gaseous by-product supplying step S11).

In this way, from the gaseous by-products, the light hydrocarbon compounds are recovered and the carbon dioxide gas is removed. Then, the gaseous by-products are reused as a feedstock of the bubble column reactor 30.

According to the hydrocarbon recovery apparatus 101 and the method for recovering hydrocarbon compounds using the hydrocarbon recovery apparatus 101 of the present embodiment, by introducing the gaseous by-products into the absorber 112, and by supplying the absorption solvent consisting of the mixed liquid of the carbon dioxide gas absorbent and the liquid hydrocarbon compounds to the absorber 112, it is possible to absorb the light hydrocarbon compounds and the carbon dioxide gas in the gaseous by-products by the absorption solvent. Then, by separating the absorption solvent into the carbon dioxide gas absorbent and the liquid hydrocarbon compounds in the separator 115, and by heating the liquid hydrocarbon compounds at a predetermined temperature, it is possible to recover the light hydrocarbon compounds from the gaseous by-products.

Additionally, since the carbon dioxide gas is removed from the gaseous by-products, the concentration of the carbon dioxide gas within the bubble column reactor 30 can be suppressed, when the gaseous by-products are supplied to the bubble column reactor 30 and are reused as a feedstock. Thus, the FT synthesis reaction can be smoothly performed.

Additionally, since the carbon dioxide gas is stripped from the separated carbon dioxide gas absorbent in the carbon dioxide stripping step S8, it is possible to reuse the carbon dioxide gas absorbent.

Additionally, since the boiling point of the liquid hydrocarbon compounds contained in the absorption solvent is within a temperature range of 200° C. or higher and 360° C. or lower, when the liquid hydrocarbon compounds are heated in the light hydrocarbon compound recovering step S9, the liquid hydrocarbon compounds which constitute the absorption solvent can be prevented from volatilizing, and the liquid hydrocarbon compounds can be reused. Additionally, the absorption solvent can keep the fluidity without freezing, even at a relatively low temperature.

Additionally, since the carbon dioxide gas absorbent is heated at a temperature of 100° C. or higher and 150° C. or lower in the carbon dioxide stripping step S8, and the liquid hydrocarbon compounds are heated at a temperature of 100° C. or higher and 200° C. or lower in the light hydrocarbon compound recovering step S9, the carbon dioxide gas absorbent and the liquid hydrocarbon compounds included in the absorption solvent can be prevented from volatilizing, and the absorption solvent can be repeatedly used.

Additionally, since the absorption tower 22 of the $CO_2$ removal unit 20 which removes the carbon dioxide gas in the synthesis gas produced in the reformer 12 is utilized as the absorber 112, the carbon dioxide gas can be removed from the gaseous by-products, and the light hydrocarbon compounds can be recovered, without separately providing a new facility.

Additionally, since the carbon dioxide gas absorbent from which the carbon dioxide gas has been stripping in the carbon dioxide stripping step S8 and the liquid hydrocarbon compounds from which the light hydrocarbon compounds have been recovered in the light hydrocarbon compound recovering step S9 are recycled to the absorber 112 as the absorption solvent in the recycling step S10, the carbon dioxide gas absorbent and the liquid hydrocarbon compounds can be repeatedly used.

Hence, the cost for recovering the light hydrocarbon compounds from the gaseous by-products can be reduced.

Although the embodiment of the present invention has been described hitherto in detail with reference to the drawings, concrete configurations are not limited to the embodiment, and the invention also includes design changes which do not depart from the spirit of the present invention.

Figure 4:
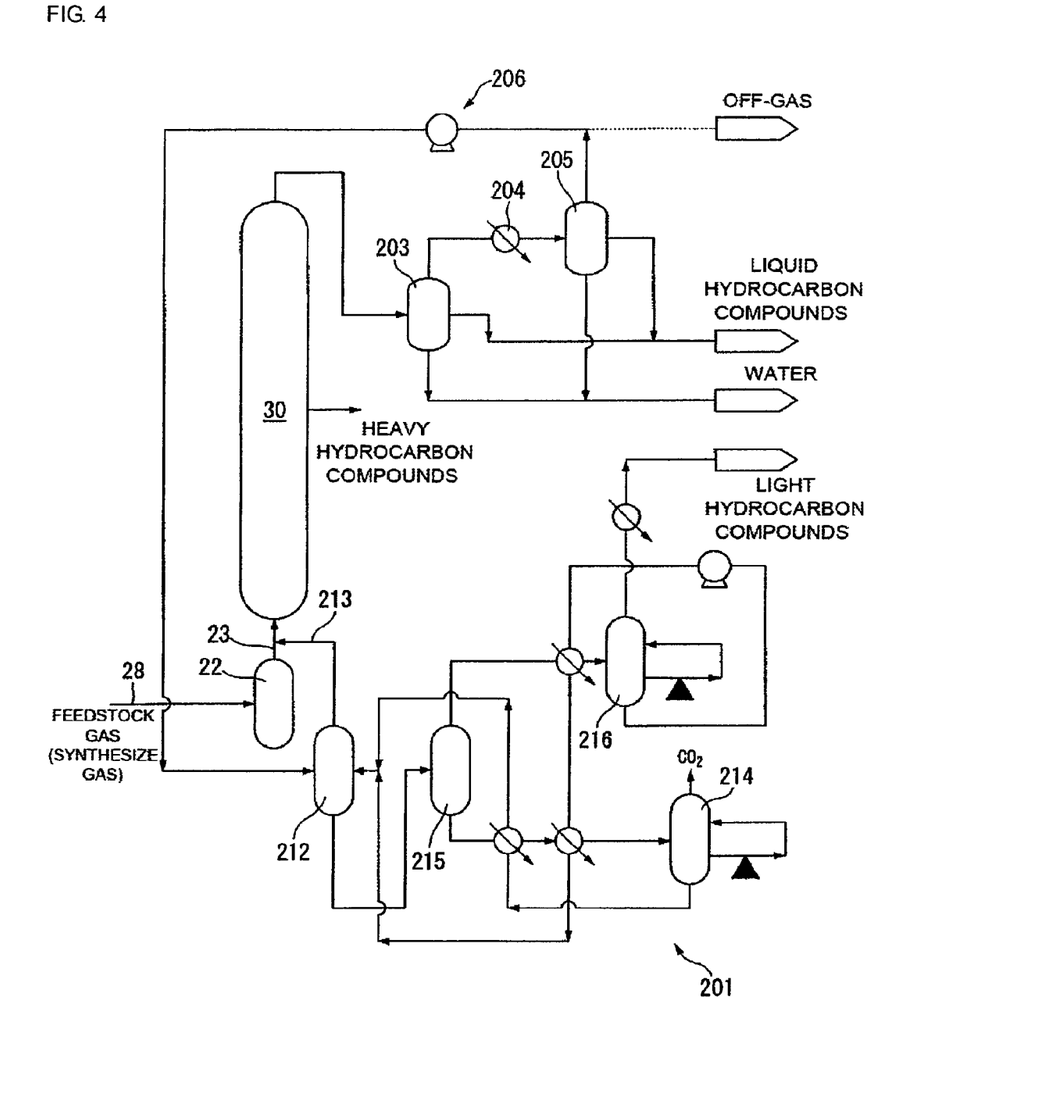
FIG. 4 is an explanatory view showing the periphery of a hydrocarbon recovery apparatus according to another embodiment of the present invention.

For example, although it has been described that the absorption tower 22 of the $CO_2$ removal unit 20 which removes the carbon dioxide gas in the synthesis gas produced in the reformer 12 is utilized as the absorber, the present invention is not limited to this. As shown in FIG. 4, another absorber 212 may be provided separately and independently from the absorption tower 22 of the $CO_2$ removal unit 20 which removes the carbon dioxide gas in the synthesis gas. In this case, the absorber 212 is used independently for the gaseous by-products. In the absorber 212, the gaseous by-products from which the carbon dioxide gas and the light hydrocarbon compounds have been removed are supplied to the FT synthesis reactor (for example, bubble column reactor 30) via an gaseous by-product supply line 213, and are reused as a feedstock.

Additionally, the carbon dioxide gas absorbent in the absorption solvent is not limited to those listed in the embodiment, and any arbitrary absorbents which can absorb and release the carbon dioxide gas are available.

Moreover, although it has been described that the carbon dioxide gas absorbent and the liquid hydrocarbon compounds are supplied to the absorber in a mixed state, the present invention is not limited to this, and a configuration may be adopted in which each of the carbon dioxide gas absorbent and the liquid hydrocarbon compounds is supplied to the absorber separately, and mixed together in the absorber.

Additionally, although the case where the first gas-liquid separator and the second gas-liquid separator which separate a liquid component in the gaseous by-products are provided has been described, the present invention is not limited to this, and a single gas-liquid separator may be provided, and three or more gas-liquid separators may be provided.

Moreover, the configurations of the synthesis gas production unit 3, the FT synthesis unit 5, and the upgrading unit 7 are not limited to those described in the present embodiment, and any arbitrary configurations in which the gaseous by-products are introduced into the hydrocarbon recovery apparatus may be adopted.

EXAMPLES

The results of confirmation experiments conducted to confirm the effects of the present invention will be described below.

As comparative examples, the gaseous by-products discharged from the top of an FT synthesis reactor were introduced into a gas-liquid separator, and condensed FT hydrocarbons were recovered. Here, Comparative Examples 1 to 3 were adopted by changing the temperature of the gaseous by-products in the gas-liquid separator.

Figure 2:
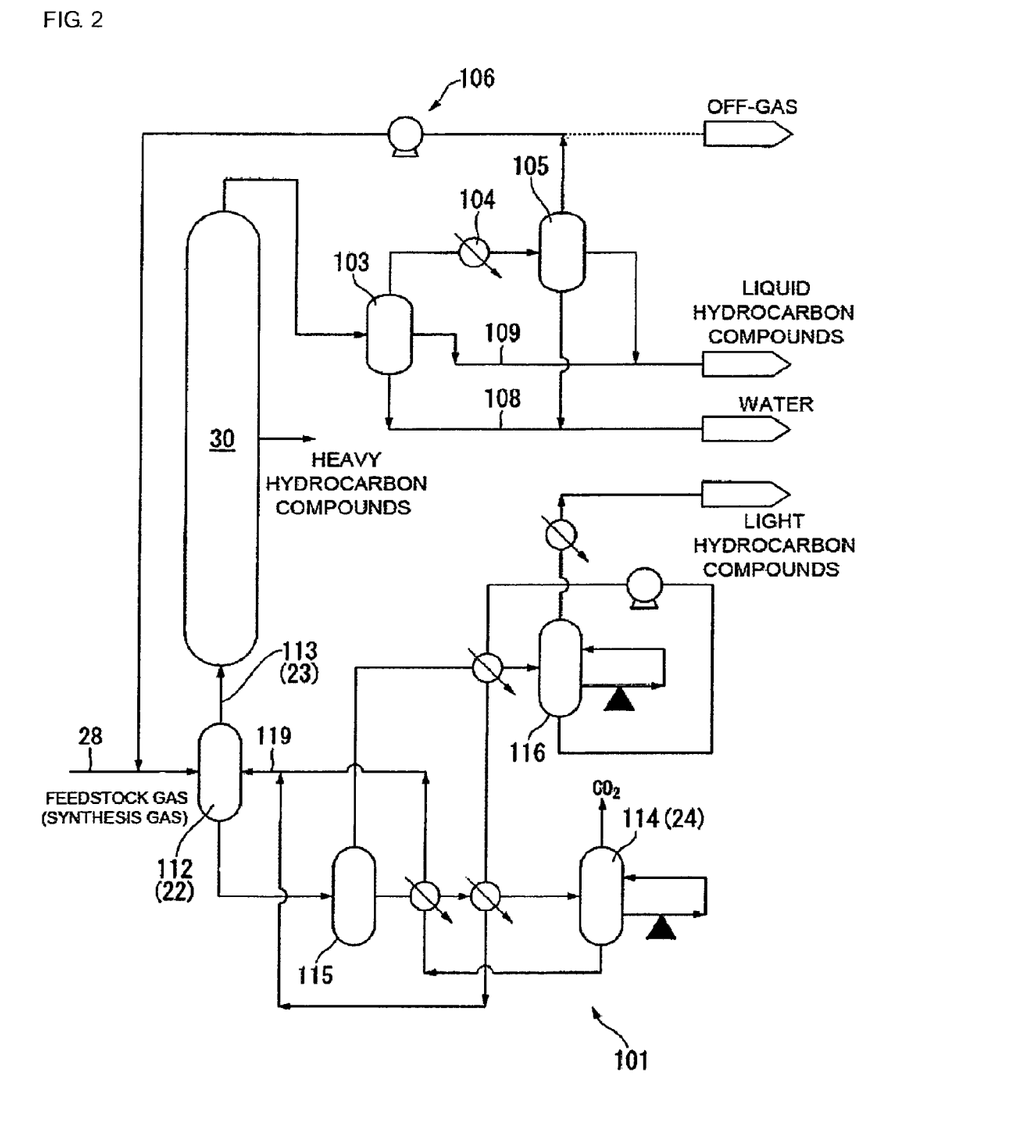
FIG. 2 is an explanatory view showing the periphery of the hydrocarbon recovery apparatus according to the embodiment of the present invention.
Figure 3:
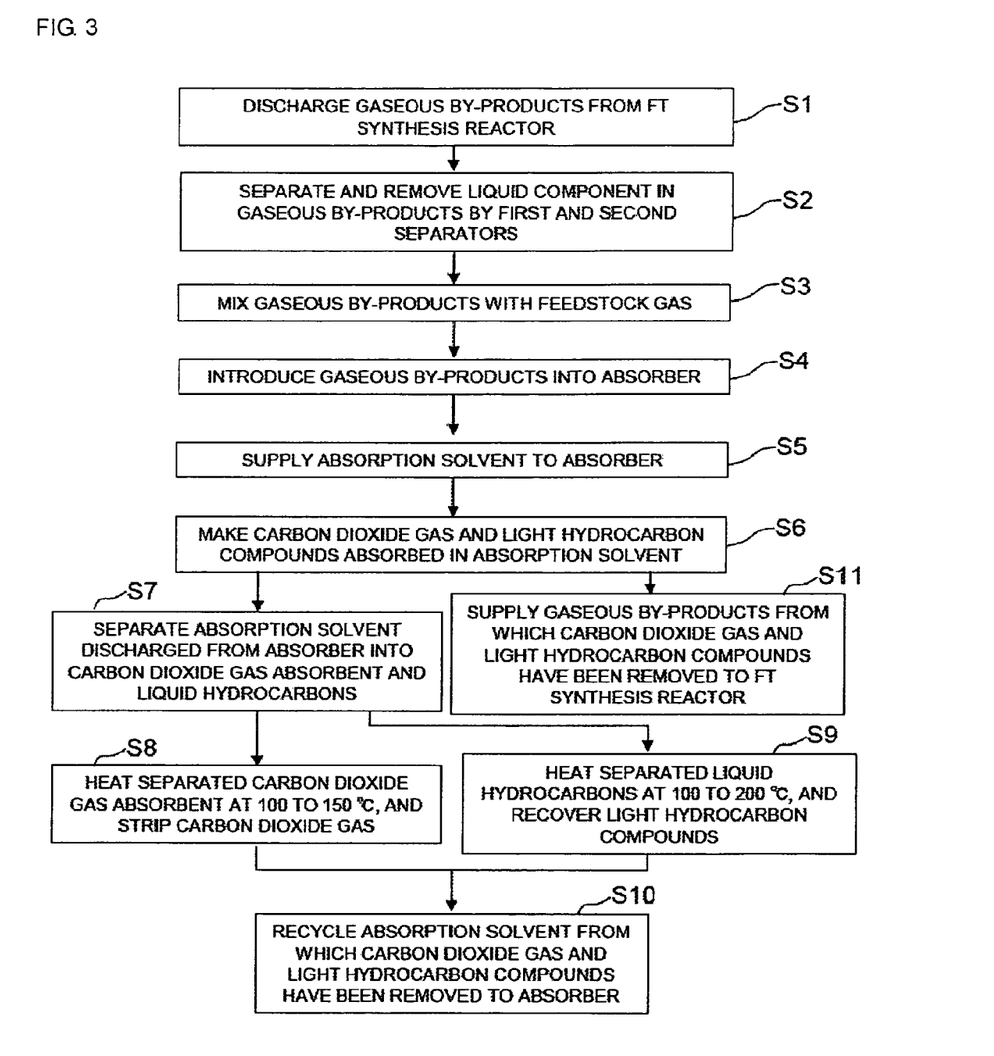
FIG. 3 is a flow chart showing the hydrocarbon compound recovery method according to the embodiment of the present invention.

As examples of the present invention, the gaseous by-products discharged from the FT synthesis reactor were introduced into the gas-liquid separator, the condensed FT hydrocarbons are recovered, and as described in the embodiment, the removal of the carbon dioxide gas included in the gaseous by-products and the recovery of the light hydrocarbon compounds included in the gaseous by-products were performed in the absorber 112 by using the apparatus shown in FIG. 2. Supplying the absorption solvent including the carbon dioxide gas absorbent (an aqueous solution with diethanolamine of 50 wt. %, and 60 vol. % with respect to the total amount of the absorption solvent), and the liquid hydrocarbon compounds (a fraction with a boiling point of 200 to 360° C. obtained by distilling an effluent of the middle distillate hydrotreating reactor 52, and 40 vol. % with respect to the total amount of the absorption solvent) to the absorber 112, and allowing the supplied absorption solvent to contact with the gaseous by-products. And the carbon dioxide gas and the light hydrocarbon compounds were absorbed from the gaseous by-products by the absorption solvent. Then, the gaseous by-products from which the carbon dioxide gas and the light hydrocarbon compounds have been removed are supplied again to the FT synthesis reactor 30 as a feedstock. Meanwhile, the absorption solvent which had absorbed the carbon dioxide gas and the light hydrocarbon compounds was separated into the carbon dioxide gas absorbent and the liquid hydrocarbon compounds in the separator 115. The liquid hydrocarbon compounds were heated in the light hydrocarbon compound recovering unit 116 where the light hydrocarbon compounds were recovered. Additionally, the carbon dioxide gas absorbent which had absorbed the carbon dioxide gas was heated in the carbon dioxide gas stripping unit 114 where the carbon dioxide gas was removed. The liquid hydrocarbon compounds from which the light hydrocarbon compounds were recovered and the carbon dioxide gas absorbent from which the carbon dioxide gas was stripped were mixed together, and were supplied again to the absorber 112. Here, Examples 1 to 3 were adopted by setting the temperatures of the gaseous by-products in the gas-liquid separator to the same as those in Comparative Examples 1 to 3, respectively.

Then, in the respective comparative examples, when the total amounts (the total amounts of the liquid hydrocarbon compounds recovered in the gas-liquid separator and the heavy FT hydrocarbons flowing out as a liquid from the FT synthesis reactor) of the FT synthesis hydrocarbons (liquid hydrocarbon compounds), which were obtained from the FT synthesis reactor, per unit time were set to 100, the total amounts (the total amounts of the liquid hydrocarbon compounds recovered from the gas-liquid separator, the light hydrocarbon compounds recovered from the recovering unit, and the heavy FT hydrocarbons flowing out as a liquid from the FT synthesis reactor) of the FT synthesis hydrocarbons (liquid hydrocarbon compounds), which were obtained from the FT synthesis reactor, per unit time in the corresponding examples were measured as production amounts. The results are shown in Table 1.

TABLE 1

|  | Temperature | Production Amount | Increase |
| --- | --- | --- | --- |
| Comparative Example 1 | 20° C. | 100 | — |
| Example 1 |  | 105.51 | 5.51% |
| Comparative Example 2 | 30° C. | 100 | — |
| Example 2 |  | 106.74 | 6.74% |
| Comparative Example 3 | 40° C. | 100 | — |
| Example 3 |  | 108.13 | 8.13% |

On the respective temperature conditions, it was confirmed that that the production amount of the FT synthesis hydrocarbons (liquid hydrocarbon compounds) increases by recovering the light hydrocarbon compounds using the absorber 112. That is, according to the present invention, the production amount of liquid hydrocarbon compounds can be increased without providing, for example, an extra cooling device, when gaseous by-products from which the carbon dioxide gas and the light hydrocarbon compounds have been removed are reused as a feedstock the FT synthesis reaction.

INDUSTRIAL APPLICABILITY

According to the method for recovering hydrocarbon compounds and hydrocarbon recovery apparatus of the present invention, the light hydrocarbon compounds can be efficiently recovered from the gaseous by-products which are generated as by-products in the FT synthesis reaction without using, for example, an extra cooling device, the gaseous by-products can be reused as a feedstock for the FT synthesis reaction by removing the carbon dioxide gas from the gaseous by-products, and the production efficiency of the liquid fuel products can be improved.

DESCRIPTION OF REFERENCE NUMERALS

30: BUBBLE COLUMN REACTOR (FT SYNTHESIS REACTOR)
101: HYDROCARBON COMPOUND RECOVERY DEVICE
112: ABSORBER
114: CARBON DIOXIDE GAS STRIPPING UNIT
115: SEPARATOR
116: LIGHT HYDROCARBON COMPOUND RECOVERING UNIT

The invention claimed is:
1. A method for recovering hydrocarbon compounds from gaseous by-products generated in a Fischer-Tropsch synthesis reaction, the method comprising:
absorbing light hydrocarbon compounds and carbon dioxide gas from the gaseous by-products using an absorption solvent including liquid hydrocarbon compounds and a carbon dioxide gas absorbent to remove the light hydrocarbon compounds and the carbon dioxide gas from the gaseous by-products;
separating the liquid hydrocarbon compounds containing absorbed light hydrocarbon compounds from the carbon dioxide gas absorbent containing absorbed carbon dioxide gas;
heating the liquid hydrocarbon compounds, which have been separated from the carbon dioxide gas absorbent, to recover the light hydrocarbon compounds from the liquid hydrocarbon compounds;
heating the carbon dioxide gas absorbent, which has been separated from the liquid hydrocarbon compounds, to strip the carbon dioxide gas from the carbon dioxide gas absorbent; and
re-using the gaseous by-products from which the light hydrocarbon compounds and the carbon dioxide gas have been removed as a feedstock gas for the Fischer-Tropsch synthesis reaction.
2. The method for recovering the hydrocarbon compounds according to claim 1,
wherein the absorption solvent contains amines as a component of the carbon dioxide gas absorbent.
3. The method for recovering the hydrocarbon compounds according to claim 1,
wherein a boiling point of the liquid hydrocarbon compounds contained in the absorption solvent is within a temperature range of 200° C. to 360° C.
4. The method for recovering the hydrocarbon compounds according to claim 1,
wherein the carbon dioxide gas absorbent, which has been separated from the liquid hydrocarbon compounds, is heated at a temperature of 100° C. to 150° C.,
and the liquid hydrocarbon compounds, which have been separated from the carbon dioxide gas absorbent, are heated at a temperature of 100° C. to 200° C.

5. The method for recovering the hydrocarbon compounds according to claim 1,
wherein the absorption of the light hydrocarbon compounds and the carbon dioxide gas in the gaseous by-products by the absorption solvent is performed after the gaseous by-products and a feedstock gas for the Fisher-Tropsch synthesis reaction have been mixed together.

6. The method for recovering the hydrocarbon compounds according to claim 1,
wherein the absorption solvent used in absorbing the light hydrocarbon compounds and the carbon dioxide gas contains carbon dioxide gas absorbent from which the carbon dioxide gas has been stripped by heating, and liquid hydrocarbon compounds from which the light hydrocarbon compounds have been recovered by heating.

\* \* \* \* \*

UNITED STATES PATENT AND TRADEMARK OFFICE
CERTIFICATE OF CORRECTION

PATENT NO.        : 8,729,139 B2
APPLICATION NO.   : 13/138472
DATED             : May 20, 2014
INVENTOR(S)       : Kazuhiko Tasaka It is certified that error appears in the above-identified patent and that said Letters Patent is hereby corrected as shown below:

In the Specification

Column 2, line 26, change "a extra cooler" to -- an extra cooler --;

Column 4, line 24, change "an Fisher-Tropsch" to -- a Fisher-Tropsch --;

Column 10, line 58, change "an gaseous by-product" to -- a gaseous by-product --.

Signed and Sealed this
Twenty-first Day of October, 2014

Michelle K. Lee
*Deputy Director of the United States Patent and Trademark Office*